Nov. 22, 1949  F. T. BYERS  2,489,007
APPARATUS FOR FEEDING HAY TO CATTLE
Filed May 15, 1946  2 Sheets-Sheet 1

INVENTOR.
FRANK T. BYERS
BY *Victor J. Evans & Co.*
ATTORNEYS

Nov. 22, 1949   F. T. BYERS   2,489,007
APPARATUS FOR FEEDING HAY TO CATTLE
Filed May 15, 1946   2 Sheets-Sheet 2
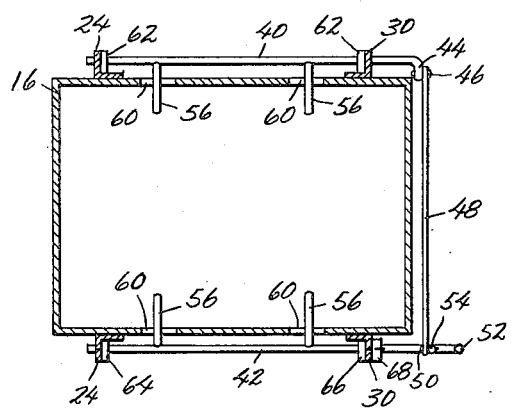
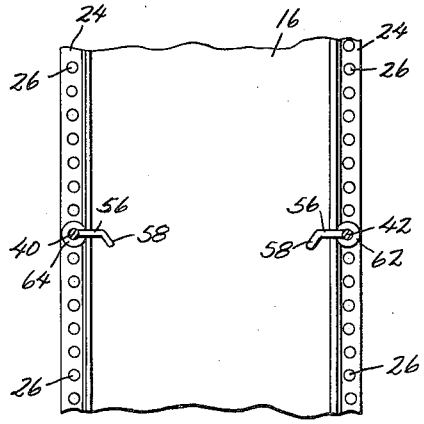
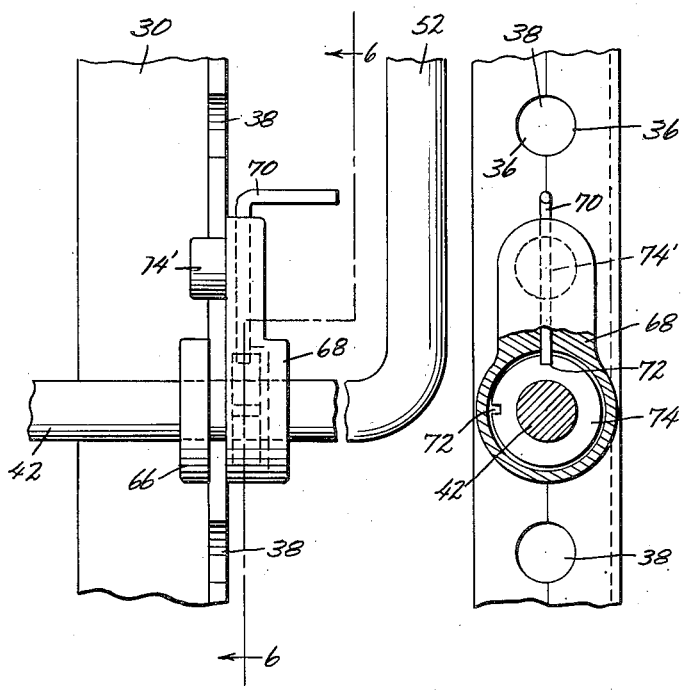
INVENTOR.
FRANK T. BYERS,
BY *Victor J. Evans & Co.*
ATTORNEYS Patented Nov. 22, 1949

2,489,007

UNITED STATES PATENT OFFICE 2,489,007

APPARATUS FOR FEEDING HAY TO CATTLE

Frank T. Byers, Mount Pleasant, Pa.

Application May 15, 1946, Serial No. 669,910

1 Claim. (Cl. 119—56)

This invention relates to an apparatus for feeding sliced bales of hay to livestock.

The invention contemplates the provision of an apparatus that will measure and conveniently feed the measured hay to the livestock as needed.

An object of the invention therefore is to provide a feeding chute and means within the chute for measuring the hay, retaining the unmeasured portion in the chute and feeding the measured portion to the livestock.

This apparatus is designed to use sliced baled hay and by its use will save the farmer considerable time in the feeding of his livestock.

With the above and other objects and advantages in view, the invention consists of the novel details of construction, arrangement and combination of parts more fully hereinafter described, claimed and illustrated in the accompanying drawings in which:

Figure 3 is a sectional view on the line 3—3 of Figure 1;

Figure 4 is a sectional view on the line 4—4 of Figure 1;

Figure 5 is a detailed view of the locking mechanism and

Figure 6 is a sectional view thereof on the line 6—6 of Figure 5.

Figure 1:
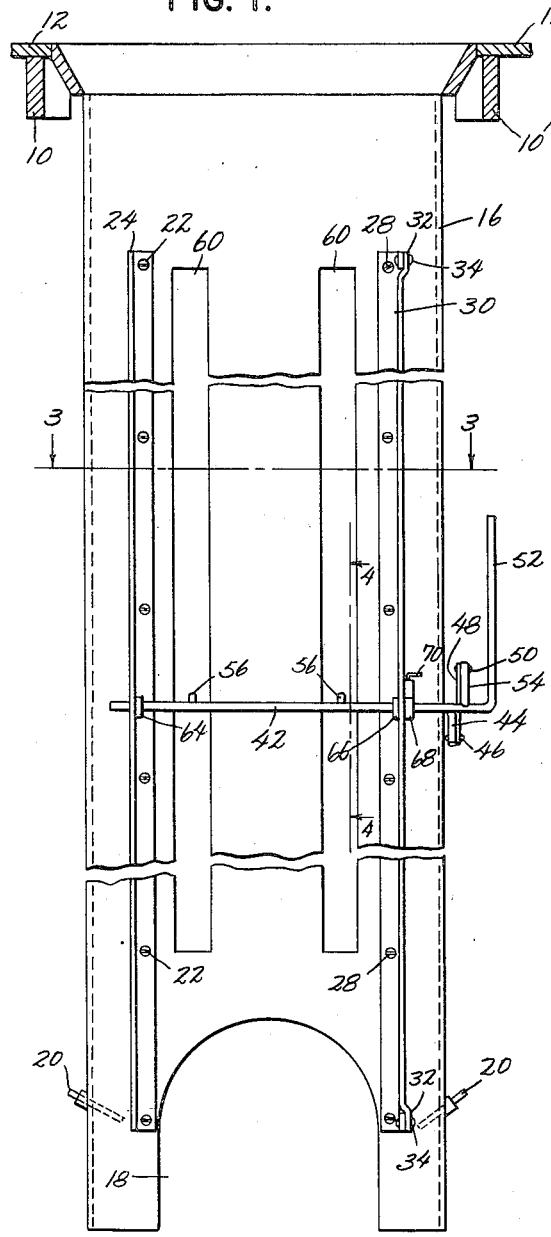
Figure 1 is an elevational view, with parts in section of an embodiment of the invention.
Figure 2:
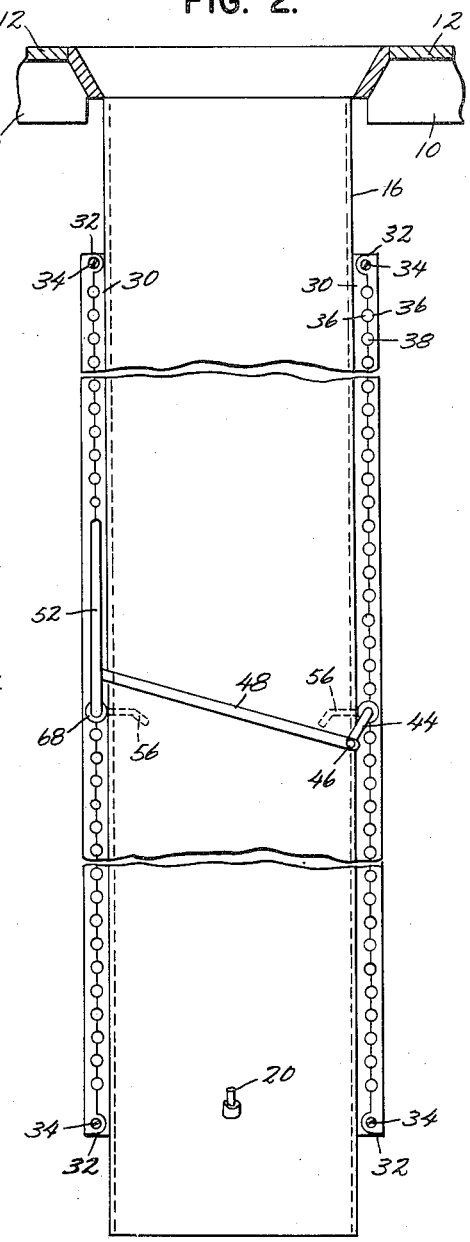
Figure 2 is a side view of Fig. 1 with parts in section.

Referring more in detail to the drawings, the reference numeral 10 designates the floor supporting beams of the hayloft of a barn on which is supported the flange 12 of the feeding mouth 14 of the chute 16. The chute 16 is rectangular in cross section and extends downwardly from the hayloft floor to the manger of the livestock. At the lower end of the chute openings 18 are provided for the discharge of the sliced bales of hay from the chute, into the manger. Adjacent the openings 18, inclined rods or bars 20 are provided in the sides of the chute to engage the slices of baled hay as it is fed to the manger, and not permit it to fall flat on the manger floor.

Secured to the opposite sides of the chute adjacent the rear of the chute in vertical relation therewith by means of fasteners 22 are angle irons 24 which are in diametrically opposed relation to each other, and are provided with longitudinally extending relatively spaced apertures 26 as shown in Fig. 4.

In spaced opposed parallel relation to the angle irons 24 and secured to the opposite sides of the chute adjacent the front of the chute by fasteners 28 are angle irons 30, but these irons are split along their vertical medial line and the sections thus formed are joined by the apertured ears 32 and fasteners 34.

The sections are provided with semicircular notches 36 which when in position form the openings 38 which are in opposed parallel relation with the openings 26 in the angle irons 24.

Journalled in these openings are the rods 40 and 42 respectively, and rod 40 is provided with a bent end 44 which is pivotably connected by a pin 46 to the link 48, which at the other end is pivoted by a pin 50 to the arm 52 on the rod 42 and movement of the handle 54 on the rod 42 will simultaneously move the rod 40 due to the action of the link 48.

Both of the rods are provided with right angularly extending feed holding arms 56, which are in alinement with each other, and provided with downwardly inclined ends 58 and then arms extend inwardly of the chute by means of the spaced parallel opposed elongated slots 60 in the front and rear of the chute. Collars 62 on rod 40 secured thereto inwardly of the angle irons 24 and 30 retain this rod in position, and a collar 64 on rod 42 inwardly of the angle iron 24 and a similar collar 66 on the inner side of the angle iron 30 retains the rod 42 in place. On the opposite side of the angle iron 30 on the rod 42 is a latch 68 having a movable dog 70 therein that engages in the slots 72 of a collar 74 mounted on the rod 42 and the latch on the rear face thereof is provided with a rearwardly extending stud 74' that engages an opening 38 in the angle iron 30 to retain the feed holding arms 56 on the rods 40 and 42 respectively in position.

In the operation of the feeder the rods 40 and 42 are positioned in the angle irons 24 and 30 in the openings therein at the proper height for the amount of feed desired to be fed to the livestock. That is, sufficient sliced baled hay is placed in the chute to feed the stock for a predetermined period. The feed engaging the arms 56 will be retained in the chute at the height from the manger that the rods 40 and 42 are positioned. In other words for a day's feeding the rods 40 and 42 will be placed in the angle irons 24 and 30 closer to the top of the chute than for a two days' feeding and so on. Thus the lower rods 40 and 42 are positioned in the angle irons 24 and 30 the more feed that will be placed in the chute using the distance between the rods and the top of the chute as a measuring means. By manipulation of the handle 52, the predetermined amount of feed will be permitted to fall past the arms 56 to the bottom of the chute. When this amount of feed has been deposited in the manger, the arms are positioned to prevent feed from falling into the manger, and the rods are locked in position by the latch 68. The chute is again refilled with either the same amount of feed or the rods 40 and 42 may be adjusted for different amounts of feed. When the livestock has eaten all the feed beneath the arms, and the chute has again been supplied with feed the handle is again manipulated to deposit the feed therein, and again locked in position for the refilling of the chute as described.

The chute is of a size to conveniently hold sliced, baled hay, and the chute will measure and feed the livestock.

It is believed that the operation and construction of the apparatus, and the method used in feeding the livestock will be apparent to those skilled in the art, and it is to be understood that changes in the minor details of construction, arrangement and combination of parts may be resorted to, providing they fall within the spirit of the invention and the scope of the appended claim.

Having thus described the invention, what is claimed as new and desired to be secured by Letters Patent is:

An apparatus of the character described, comprising a rectangular shaped feed receiving chute, a feeding mouth of greater dimension than said chute formed on the upper end of said chute, a supporting marginal flange formed on said mouth at right angles thereto, feed discharging openings at the lower end of said chute, feed agitating rods in said chute adjacent said feed discharging openings, apertured angle irons secured to said chute on the sides of the chute containing the feed openings, split angle irons provided with apertures secured to each of the same sides of the chute as said first angle irons and in opposed relation thereto, the apertures in said split angle irons being in alignment with the apertures in said first angle irons, rods journalled in the apertures in the angle irons on both sides of said chute, linkage joining said rods for simultaneous action thereof, relatively spaced vertically disposed parallel slots in the chute underlying said rods, feed holding arms on said rods extending into said chute through said slots, means carried by the chute for retaining said arms in feed holding position and said rods being adapted to be selectively received in the said apertured angle irons at a position to determine the amount of feed to be discharged from said chute through said feeding openings.

FRANK T. BYERS.

REFERENCES CITED

The following references are of record in the file of this patent:

UNITED STATES PATENTS

| Number | Name | Date |
|---|---|---|
| 867,221 | Croshier | Sept. 24, 1907 |
| 937,723 | Seifert | Oct. 19, 1909 |
| 2,121,407 | Ramsey | June 21, 1938 |
| 2,207,395 | Brown | July 9, 1940 |

OTHER REFERENCES

Mechano Catalogue, published by The Embossing Co., Albany, N. Y., copyright Sept. 24, 1910. Page 50. (A copy in Div. 57 U. S. Patent Office.)